United States Patent [19]

Speakman

[11] 4,279,791
[45] Jul. 21, 1981

[54] RECOVERY OF CERIUM FROM POLYMER DISPERSIONS

[75] Inventor: Edwin L. Speakman, Clinton, Iowa

[73] Assignee: Standard Brands Incorporated, New York, N.Y.

[21] Appl. No.: 147,775

[22] Filed: May 8, 1980

[51] Int. Cl.³ ............................................. C08L 3/02
[52] U.S. Cl. ........................... 260/17.4 GC; 210/681; 423/6; 423/21.5; 423/182; 423/DIG. 14; 521/26; 521/28; 521/30; 521/33; 528/482
[58] Field of Search ................. 260/17.4 GC; 521/26, 521/28, 30, 33

[56] References Cited

U.S. PATENT DOCUMENTS

| | | | |
|---|---|---|---|
| 2,694,681 | 11/1954 | Bray et al. ............................ | 423/21.5 |
| 2,897,050 | 7/1959 | Jaffe ..................................... | 521/30 |
| 2,922,768 | 1/1960 | Mino et al. .................. | 260/17.4 GC |
| 3,509,084 | 4/1970 | Aspon et al. ........................ | 528/482 |

FOREIGN PATENT DOCUMENTS 1128696 10/1968 United Kingdom ............ 260/17.4 GC

*Primary Examiner*—Edward M. Woodberry
*Attorney, Agent, or Firm*—Richard Kornutik; Henry S. Wyzan; Robert A. Conzett

[57] ABSTRACT

This invention relates to removal of cerium, used as a free-radical initiator, from aqueous polymeric dispersions, particularly starch graft copolymer dispersions, by adsorbing cerium (III) onto a strong cation exchange resin, to separation of the adsorbed cerium (III) from the resin using a solution such as sodium sulfate or sodium oxalate to form a cerium (III) precipitate, and to oxidation of the separated cerium (III) to cerium (IV).

18 Claims, No Drawings

RECOVERY OF CERIUM FROM POLYMER DISPERSIONS

BACKGROUND OF THE INVENTION

1. Field of the Invention

This invention relates to the preparation of an essentially cerium-free polymeric dispersion from a dispersion containing Ce (III) derived from Ce (IV) used to initiate free radical polymerization, to recovery of Ce (III) from polymeric dispersions and to regeneration of Ce (IV) from Ce (III) recovered from the polymeric dispersions.

2. Polymerization Products Containing Ce (III)

Ce (IV) has been widely used to initiate free radical polymerization of vinyl monomers. In the course of such reaction the Ce (IV) is reduced to Ce (III) which remains with the reaction products.

Mino et al., U.S. Pat. No. 2,922,768 disclose the use of Ce (IV) salts to induce vinyl polymerization on a wide variety of compounds such as those containing alcoholic hydroxy groups, ketones, mercaptans, amines, aldehydes, polyvinyl alcohol, cellulose and cellulosic materials, starch, partial ethers of starch and partial esters of starch. Some of Mino's products were polymeric dispersions (latices). The polymeric products were recovered by precipitation, i.e., destruction of the dispersion. Gugliemelli, et al., U.S. Pat. No. 3,377,302, prepared polymeric dispersions from granular or gelatinized starch polymerized with methyl acrylate using ceric ammonium nitrate to initiate the reaction. Separation of the polymer was accomplished by filtration. Similarly, Gugliemelli, et al., U.S. Pat. No. 3,425,971 separated the product obtained by using ceric ammonium nitrate to graft polymerize acrylonitrile onto starch by filtration. Jones, et al., U.S. Pat. No. 3,669,915, polymerized starch with 2-hydroxy-3-methacryloyloxypropyltrimethylammonium chloride. Solids were separated by centrifugation. D. A. Jones, et al., *Die Starke* 24, Jahrg. 1972/Nr 1. show starch and acrylonitrile polymerized with a ceric initiator. Here, also, separation was by centrifugation. Ichikawa, et al., Japanese Kokai No. 7668,641, graft polymerized polyvinylalcohol with acrylic monomers or chloroprene. The resultant aqueous solutions were passed over an ion exchange resin to remove acrylate monomer. In all cases except the latter, which involved a solution rather than an aqueous dispersion, methods which may have separated Ce (III) from the polymer resulted in destruction of the dispersion, if any.

3. Removal of Ce (III) from Resin

J. Mikler, et al. (CA, 64: 18921) have reported the removal of cerium (III) adsorbed on an ion exchange resin using lactic acid in caustic solution. This method appears to sequester the cerium in a soluble form, incapable of being reabsorbed by the resin, through formation of a complex ion of cerium and the lactic acid.

4. Oxidation of Cerium (III) to Ce (IV)

The +4 oxidation state of cerium is discussed in *The Chemistry of the Lanthanides*, T. Moeller (Selected Topics in Modern Chemistry) pp. 60–66, Reinhold Publishing Corporation, N.Y. (1963). Moeller discusses the oxidation of Ce (III) to Ce (IV) by chemical oxidizing agents such as $S_2O_8^{2-}$ and $O_3$ at page 61 where Moeller also notes that Ce (IV) is best prepared by electrolytic oxidation. Oxidation with oxygen at elevated temperatures through ignition in air of a thermally decomposable oxy anion is discussed at page 65 of this reference as is chemical oxidation with oxygen at ordinary temperatures. In this latter case Moeller notes that cerium (III) oxide or hydrous hydroxide slowly adsorbs atmospheric oxygen and ultimately yields the dioxide, $CeO_2$. This reference also discloses that such oxidation is more rapid with alkaline hydrogen peroxide or sodium hypochlorite; that both bromate ion and permanganate ion oxidize Ce (III) to the dioxide in suitably buffered solutions; and that peroxy disulfate yields cerium (IV) under acidic conditions.

SUMMARY OF THE INVENTION

In one aspect the present invention provides a method for preparing an essentially cerium-free dispersion from a dispersion containing Ce (III) derived from Ce (IV) used to initiate free radical polymerization comprising contacting a polymeric dispersion with a pH less than about 5, which dispersion contains the Ce (III), with a cation exchange resin. Another aspect of this invention includes a method for the separation of the Ce (III) from the cation exchange resin and the recovery of the Ce (III). In a further aspect this invention encompasses a method for oxidizing the recovered Ce (III) to Ce (IV).

OBJECTS OF THE INVENTION

It is an object of this invention to produce essentially cerium free dispersions from polymeric dispersions containing Ce (III) derived from Ce (IV) used to initiate free radical polymerization.

It is a further object of this invention to recover Ce (III) from polymeric dispersions containing Ce (III) derived from Ce (IV) used to initiate free radical polymerization.

It is a still further object of this invention to provide a method for the recovery of Ce (III) from polymeric dispersions containing Ce (III) derived from Ce (IV) used to initiate free radical polymerization and regeneration of the recovered Ce (III) thereby conserving Ce (IV) used for the initiation of free radical induced polymerization.

UTILITY

Polymeric dispersions produced by free radical initiation have a variety of uses such as use as adhesives, sizes for textile fibers, bases for coatings and as textile print paste thickeners. The valuable and useful portion of these dispersions is the polymer. The residual Ce (III) serves no useful purpose in the dispersion and in some cases, such as where the intended use is in an adhesive which may be placed in close proximity to a foodstuff, the cerium is an undesirable component of the dispersion. Moreover, cerium is expensive and the Ce (III), when recovered, is a useful starting material for the production of Ce (IV) compounds which, as previously described, are useful free radical initiators for vinyl polymerizations.

DESCRIPTION OF THE INVENTION

In one aspect the present invention involves removing cerium (III) from a polymeric dispersion prepared using a cerium (IV) free-radical initiator, in another, the separation of cerium (III) from a cation exchange resin, and in still another, preparation of cerium (IV) from the cerium (III).

In one or more of its aspects the present invention involves the steps, singly or in a specific combination of steps, which comprise: contacting a polymeric dispersion with a pH less than about 5, which dispersion has been produced by a polymerization reaction in an aqueous medium initiated by free radicals induced by the action of Ce (IV), with a strong cation exchange resin to adsorb residual Ce (III) derived from the Ce (IV) free radical initiator; releasing the adsorbed Ce (III) as a precipitate with a salt solution and separating the precipitate from the cation exchange resin; and oxidizing the separated Ce (III) to Ce (IV). After conversion to Ce (IV) the Ce (IV) may be treated with mineral acids to solubilize the Ce (IV) for use in further polymerizations.

Although generally applicable to the removal of Ce (III) from stable aqueous polymeric dispersions containing Ce (III) the method of this invention is especially useful in removing Ce (III) from aqueous dispersions of starch graft copolymers. As discussed above, Ce (IV) is particularly useful as a free radical initiator for graft polymerization of vinyl monomers onto starch. When such polymerization reaction is carried out in an aqueous medium, utilizing a properly derivatized and thinned starch and a vinyl monomer or monomers which yield a water insoluble polymer, the products can be obtained in the form of aqueous dispersions (latices) which show no substantial change in viscosity over extended periods of time. The method of the present invention is particularly well suited to the removal of Ce (III) from such dispersions. Using this method, an essentially cerium-free product, that is, a product containing less than about 0.0015% by weight, based on the dry solids contained in the dispersion, of cerium can be produced. Since much of the commercial value of such dispersions resides in or is associated with the ease of handling, mixing and application of a dispersion it is necessary that the Ce (III) be removed without destruction of the dispersion. This can be achieved by contacting the dispersion with a cation exchange resin thereby adsorbing the cerium (III). In general, the suitable resins are the strong acid cation exchange resins. The resin may be in the hydrogen form or in a combined hydrogen-cation form. When in the hydrogen form, sodium, potassium, lithium and ammonium ions are suitable ions. Sodium is preferred. The combined hydrogencation form of the resin permits the resin-treated dispersion to remain at a suitable pH. Where it is desirable that the pH be controlled during removal of the Ce (III) from the dispersion, as is the case with the starch graft copolymer dispersions, the combined hydrogen-cation form of the resin is preferred. Suitable cations for use in the combined hydrogen-cation resins include sodium, potassium, lithium and ammonium cations. Of these cations, sodium is preferred.

To remove the Ce (III) the dispersion, at a pH of 5.0 or less, is contacted with a strong cation exchange resin. For a starch graft copolymer dispersion a pH in the range from about 2.0 to about 4.5 is preferred. If necessary, the pH may be adjusted with a mineral acid such as sulfuric acid or a base such as ammonium hydroxide. It is desirable, when using a bed of resin, that the dispersion readily flow through the bed. The viscosity of excessively viscous dispersions may be temporarily reduced by heating to facilitate passage of the dispersion through the resin bed. It is preferable that there be no substantial difference between the temperature of the cation exchange resin and the dispersion. It is also desirable that the dispersion be sieved to eliminate polymeric aggregates prior to contact with the resin.

For optimum removal of Ce (III) all portions of the dispersion should come into intimate contact with the resin. This is conveniently done by passing the dispersion through a bed of the resin supported by a screen or other means which supports the bed while permitting passage of the dispersion through the support. For maximum removal of cerium the bed should be of a depth sufficient to assure thorough contact of the dispersion with the cation exchange resin during passage through the bed. Use of such a bed also permits adsorbtion of the Ce (III) by the resin and separation of the dispersion from the resin in one step.

It is desirable that the Ce (III) be separated from the resin for further usage of both the cerium and the resin. Surprisingly, we have found that this is best accomplished by formation of an immediately insoluble precipitate. In contrast to the relatively long periods of time and the volumes of liquids required for conventional desorbtion the precipitation step is rapid and requires no excessive volume of liquids. Surprisingly, the precipitated cerium (III) does not clog or fill the pores of the resin and is readily removed by washing or decantation.

Simultaneous separation of cerium from the resin and regeneration of the resin may be accomplished by treating the resin containing the adsorbed cerium with a solution of a salt of a strong monovalent cation such as sodium, potassium or lithium and sulfuric or oxalic acid. Any solution which yields an insoluble Ce (III) compound is suitable. Choice of the cation, where regeneration of the resin is desired, will depend upon the cationic form of the resin used for the separation. Where the combined hydrogen-sodium form of the resin has been used for the separation the preferred salt for removal of the cerium from the resin and simultaneous regeneration of the resin is sodium sulfate. When sodium sulfate is used for the separation the cerium is precipitated as finely divided cerous sulfate and this may be separated from the resin by decantation or by being washed off the resin, the resin being supported on a suitable sieve.

With a sodium sulfate solution the precipitation of the cerium requires a concentration of sodium sulfate of at least about 0.36 molar in the solution with which the resin is treated. Although a solution of sodium sulfate in weak sulfuric acid can be used to effect the separation, concentrated and lesser strengths of sulfuric acid, in the absence of sodium sulfate, fail to separate Ce (III) from the resin. In arriving at the minimum concentration of sodium sulfate it is necessary to take the liquid volume contained within the voids of the wet resin into consideration. With a resin having an average void volume of about 38% the required concentration can be achieved with one bed volume of a 0.5 molar sodium sulfate solution. The minimum concentration, about 0.36 molar sodium sulfate, should be maintained throughout the precipitation step. Such concentration may be obtained by adding a solution of sodium sulfate to the resin or by dissolving solid sodium sulfate in an aqueous suspension of the resin. As previously indicated, separation can be achieved at a molar concentration of sodium sulfate of about 0.36 or greater. The maximum concentration is limited only by the solubility of sodium sulfate. The preferred range of concentration of sodium sulfate is from about 0.5 molar to about 1.0 molar.

If required, after separation of the cerium the resin may be regenerated to the strong cation or combined hydrogen-cation form by conventional means such as treatment with strong acids and the strong cation salts of such acids.

After separation from the resin the recovered Ce (III) is oxidized to Ce (IV). As previously discussed this can be done in acid media with agents such as $S_2O_8^{2-}$ and $O_3$ or by thermal decomposition of cerium (III) compounds containing oxy anions, such as $Ce_2(CO_3)_3$, $Ce(OH)_3$ and $Ce_2(C_2O_4)_3$, in air.

In the preferred method the separated Ce (III) is converted to the hydrous hydroxide with a strong base such as sodium or ammonium hydroxide. The hydrous Ce (III) hydroxide is then oxidized to Ce (IV) by passing air, or oxygen, through the suspension, while maintaining the aqueous medium at a pH of about 6 or greater. The reaction may conveniently be monitored by periodically acidifying a sample of the reaction mixture with strong sulfuric acid. The development of a yellow color indicates the presence of Ce (IV), the intensity of color indicating, qualitatively, the extent to which the Ce (III) has been oxidized to Ce (IV).

The following examples illustrate the invention and are not intended to limit the scope of the invention or the ambit of the claims.

EXAMPLE I

This Example illustrates the starch graft copolymer dispersions for which the methods of the present invention are particularly useful.

An amount of a starch slurry containing 287.3 g of starch (dry substance) was placed in a resin kettle equipped with an agitator and a thermometer. The slurry was heated to 43° C. and 34 ml of a solution containing 2.4 g of NaOH and 8.9 g of NaCl were added along with 28.7 g of $Na_2SO_4$.

Then, 15.8 g of acrylonitrile were added and the reaction was allowed to proceed for 14 hours while maintaining a temperature of 43° C. The pH of the reaction mixture was then adjusted to 7 with 4.6 ml of 20° Bé muriatic acid, the product was filtered and the filter cake washed. The cyanoethyl starch had a degree of substitution of 0.14 based on its nitrogen content.

The wet cake containing 300 g of cyanoethyl starch was suspended at a solids level of 32 percent in deionized water in a 2 liter resin kettle equipped with an agitator, thermometer, reflux condenser and nitrogen sparge. The pH of the suspension was adjusted to 7.5–7.8 and 3729 liquefons of alpha-amylase derived from *B. subtilis* were added. The cyanoethyl starch was gelatinized and thinned according to the following time temperature schedule:

| Time minutes | 0 | 15 | 45 | 75 | 80 | 100 |
|---|---|---|---|---|---|---|
| Temp., °C. | 28 | 53 | 78 | 78 | 90 | 96 |

The alpha-amylase was inactivated at 96° C. and the thinned starch was cooled while sparging with nitrogen. The viscosity of the thinned starch was 260 cps.

After cooling the thinned starch to a temperature of 60° C., 10.7 g Triton X-200 (as purchased) and a mixture of 109.2 g of ethyl acrylate and 9.6 g of acrylonitrile were added. The temperature was lowered to 30°–35° C. and 3.75 g of ceric ammonium nitrate dissolved in 50 g of deionized water were added.

After the exothermic reaction subsided, 1.2 g methacrylic acid was added at 40° C. and heating was continued to a temperature of 60° C. The reaction mixture was maintained at a temperature of 60° C. for 3 hours and then 0.5 g each of ammonium persulfate and sodium metabisulfite was incorporated into the reaction mixture to reduce the level of unreacted monomers. The mixture was maintained at 60° C. for an additional 50 minute period, cooled to room temperature and the pH adjusted to about 8.5 with a solution of 28 percent ammonium hydroxide (2.7 g).

The final preparation had a solids content of 39.2 percent. The results set forth in the following table illustrate the viscosity stability of the copolymer.

TABLE 1

| Period | Vicosity (cps) |
|---|---|
| 1st day | 560 |
| 3 days | 588 |
| 6 days | 632 |
| 10 days | 660 |
| 2 months | 640 |

The columns used in Examples 2–4, which follow, consisted of two jacketed columns arranged vertically and connected with a threaded joint. The lower column, containing the resin, was 54 cm long, had an inside diameter of 1.54 cm and was fitted at the bottom with a screen to retain the resin. The upper column, 35 cm long with an inside diameter of 2.5 cm, provided a reservoir, in which the dispersion could be heated. A tube fastened to the bottom of the inner portion of the upper column extended into the lower column and, terminating just above the resin bed, minimized disturbance of the resin bed as the dispersion flowed into the lower column. Water from a bath maintained at 70° C. was circulated, serially, through the jackets of the lower and the upper columns.

EXAMPLE II

A 52 ml volume of cerium-free strong cation exchange resin was treated, in bulk, four times in succession, each time with 52 ml of 1 Normal sulfuric acid by suspending and stirring the resin in the acid to put the resin in the hydrogen form. The treated resin was transferred to the column and another 52 ml of 1 Normal sulfuric acid was passed through the column to assure complete conversion of the resin to the hydrogen form. The resin was then washed with deionized water until the effluent was free of sulfate ion.

One hundred milliliters of a starch graft copolymer dispersion were adjusted to pH 5.0 with sulfuric acid. This was sieved through a 100 mesh sieve and poured into the upper column. The sample was held for 15 minutes to allow it to reach column temperature. Flow through the column was started and maintained at about 0.025 bed volumes per minute. The effluent was collected in 15 ml portions and the pH of each was measured. The portions were combined to provide two approximately equal samples representing the first and last parts of the run. The samples were analyzed for pH and cerium content. The results showed 99.65% and 100% of the cerium originally present had been removed and that the pH of the samples was 1.38 and 1.30.

EXAMPLE III

This example shows the effect on cerium removal of having the resin in sodium form. Cerium-free resin (50 ml) as in Example II in sodium form was placed in the jacketed column. Three bed volumes (BV) of 14.2% sodium sulfate solution at pH 5.0 were run down through the column to ensure complete conversion to the sodium form. The resin was washed sulfate free. A 150 g sample of a starch graft copolymer dispersion, sieved and adjusted to pH 5.1, was placed in the column reservoir and brought to temperature. The sample was run through the column at up to 0.025 BV per minute and 25 ml increments of effluent were collected. Analysis of the effluent showed 91.0% of the cerium removed and an average pH of 5.0. The higher pH of the effluent as compared to the pH of the effluent in Example II (1.38–1.30 versus 5.0) appeared to be related to the lesser removal of cerium (99.65% - 100% versus 91.0%) obtained in this Example.

EXAMPLE IV

This Example demonstrates the removal of cerium from a dispersion using a resin in combined hydrogen and sodium form.

A resin as in Example II (61 ml) in the sodium form was suspended in 2 BV (122 ml) of sodium sulfate solution (14.2 g per 100 ml of solution). The pH of the suspension was adjusted to 3.0 with sulfuric acid over a period of 15 minutes until the pH had become stable. The resin was placed in the lower column and washed free of sulfate ion. One hundred milliliters of a sieved starch graft copolymer dispersion at a pH of 2.2 was placed in the upper column, allowed to come to temperature and passed through the resin at a rate of 0.020 BV per minute. Samples were obtained as in Example II and analyzed. The results showed 99.31% and 100% removal of the cerium from the dispersion and pH of 2.49 and 2.55.

EXAMPLE V

This Example demonstrates recovery of Ce (III) absorbed on a strong cation exchange resin.

A sample (9.4 ml) of a strong cation exchange resin in hydrogen form was loaded with cerium (7.9 mg per ml of resin) by stirring the resin in a solution of cerous nitrate. The resin was removed from the solution, washed thoroughly and suspended in 15 ml of deionized water. Thereafter 7 g of anhydrous sodium sulfate were stirred into the suspension. Almost immediately a milky white precipitate appeared. The resin was allowed to settle and the precipitate was separated by decantation. Tests showed the white precipitate contained cerium.

The process of loading the resin and separating the cerium was repeated several times with the same resin sample with identical results thus demonstrating that cerium was released from the resin prior to forming the precipitate and that the precipitated cerous sulfate is formed outside of the resin and does not clog the resin pores.

In subsequent trials it was demonstrated that recovery of the cerium from the resin can be accomplished with sodium sulfate solution using 1 molar sodium sulfate.

The precipitate was readily separated from the resin by settling and decantation or by washing the precipitate through a sieve having openings small enough to retain the resin.

EXAMPLE VI

This Example shows the reactivation (oxidation of Ce (III) to Ce (IV) of cerium after removal of cerium from the ion exchange resin.

A suspension of Ce (III) precipitate in acidic sodium sulfate solution, removed from resin as described in Example V, was made alkaline (pH 9) with ammonium hydroxide. This changed the very fine precipitate to a heavy, flocculent, white precipitate of cerous hydroxide. A qualitative test of the precipitate showed that no Ce (IV) was present. The test consisted of placing a small amount of the precipitate in 2–3 ml of strong sulfuric acid, the presence of Ce (IV) being indicated by a yellow color.

The alkaline suspension (pH 9) was sparged with air under moderate stirring. A color change was noted in 30 minutes. A weak positive qualitative test for Ce (IV) was obtained in 3 hours. Sparging was continued overnight with sufficient ammonium hydroxide added to maintain an alkaline pH. At this time, the pH was 8.0, the precipitate was a light cream color and a strong positive test for Ce (IV) was observed. The precipitate was recovered by centrifugation, washed several times with water and the suspension was added to 100 ml of 1.22 N sulfuric acid. The mixture was heated to 70° C. and 5 ml of reagent grade, concentrated sulfuric acid was cautiously added to dissolve the soluble portion of the precipitate. The acidic suspension (180 ml) was evaporated over a boiling water bath to 24 ml of a nearly clear solution. The solution was diluted to 50 ml. Analysis of this solution showed 0.218 moles of Ce (IV), 0.050 moles of Ce (III) and 4.85 moles of hydrogen ion per liter. This demonstrated that Ce (III) which had been removed from a starch graft copolymer dispersion and then recovered from ion exchange resin as a precipitate was successfully oxidized to Ce (IV) by contacting the solid precipitate in alkaline medium with air.

Substantially the same results were obtained when oxygen was sparged through a similar alkaline suspension.

EXAMPLE VII

This Example illustrates the steps of recovering and of reactivating cerium recovered from a dispersion followed by a utilization of the reactivated cerium in the graft polymerization of vinyl monomers onto starch.

The pH of an aqueous suspension of a strong cation ion exchange resin in sodium form was adjusted with sulfuric acid until the pH was stable at 2.5. Thereafter the resin was placed in the column and washed with water until free of sulfate ion. The resin was then used to separate cerium from a starch graft copolymer dispersion. The cerium was recovered from the washed resin by treatment with 1 Molar sodium sulfate solution as in Example V. The precipitate was sieved from the resin and washed to remove salts. The Ce (III) precipitate was then oxidized by sparging with air and dissolved in acid according to the method of Example VI.

An aqueous suspension of hydroxyethyl starch (prepared wth 6 percent ethylene oxide by the method of Example I) at a pH of about 7.8 was liquified with alpha amylase derived from *B. Subtilis*. A quantity of the resulting hydroxyethyl starch paste which contained 350 g of starch, dry basis, at a solids content of 35 percent was placed in a two-liter resin pot. With the paste being stirred at 60° C., nitrogen flow over the surface was started and continued throughout the period of the reaction. Triton X-200, a sodium salt of an alkylaryl polyether sulfonate sold by Rohm & Hass Company, 7.9 g dry basis, and a mixture of 163.8 g of ethyl acrylate and 14.4 g of styrene were then added to the paste. Thereafter 34.7 ml of a solution containing 1.06 g of the reactivated cerium was added to the reaction mixture. The pH of the mixture dropped to 0.8 and the temperature increased from 50° C. to 70° C. in 7 minutes thus demonstrating initiation of the polymerization reaction.

Ammonium hydroxide was added to the reaction mixture to raise the pH to 2.5. This stopped the reaction. Polymerization was re-initiated by adding another 34.7 ml of the reactivated cerium solution after adjusting the pH of the solution to 1.8 with ammonium hydroxide. After addition of the cerium solution the temperature rose from 73° C. to 76.5° C. over 21 minutes. The temperature was then maintained at 75° C. for 3 hours. Then 0.5 g each of ammonium persulfate and sodium bisulfite were added to scavenge unreacted monomers. The temperature rose only 1 degree showing only small amounts of unreacted monomer remained.

The resulting product contained 40.1% solids, dry basis, had a pH of 8.3 and a Brookfield viscosity of 196 cps (25° C., #2 spindle at 20 rpm).

Films of the dispersion cast on glass were smooth, continuous and adherent and were similar to those obtained from dispersions of starch graft copolymers in which polymerization had been initiated with commercial ceric ammonium nitrate.

EXAMPLE VIII

This example illustrates recovery of cerium adsorbed on a strong cation exchange resin by formation of a precipitate using sodium oxalate.

Cerium (III) was removed from a starch graft copolymer dispersion by contacting the dispersion with a strong cation exchange resin in the combined hydrogen-sodium form. The resin was separated from the dispersion and thoroughly washed with water.

A 50 ml portion of the settled, wet resin was added to a 100-ml graduated cylinder. After this, 50 ml of a 0.27 molar sodium oxalate solution which had been adjusted to a pH of 5 were added to the cylinder. The contents of the cylinder were then thoroughly mixed by several inversions of the cylinder. Adjusting for the average void volume of the wet resin, the resultant concentration of sodium oxalate was about 0.20 molar. The final pH of the solution was 4.6. This procedure resulted in the immediate formation of a precipitate of cerium (III) oxalate.

What is claimed is:

1. The process for removing cerium (III) from a stable, acidic, aqueous polymeric dispersion having a pH of less than about 5.0 which comprises contacting said dispersion with a strong acid cation exchange resin wherein said cation is selected from the group consisting of hydrogen and hydrogen in combination with sodium, potassium, lithium or ammonium ion thereby adsorbing said cerium (III) onto the resin and thereafter separating said resin along with adsorbed cerium (III) from said dispersion.

2. The process of claim 1 wherein the residual cerium (III) after separation of the dispersion and the resin is not greater than about 0.0015% by weight based on the dry solids contained in the dispersion.

3. The process of claim 1 wherein the polymeric portion of the dispersion is comprised of a starch graft copolymer.

4. The process of claim 3 wherein the residual cerium (III) after separation of the dispersion and the resin is not greater than about 0.0015% by weight based on the dry solids contained in the dispersion.

5. The process of claim 4 wherein the resin is in the combined hydrogen-cationic form and the cation is selected from the group consisting of sodium, potassium, lithium and ammonium.

6. The process of claim 5 wherein the pH of the dispersion is in the range from about 2.0 to about 4.5.

7. The process of claim 6 wherein the cation is sodium.

8. The process of claims 4, 5, 6 or 7 wherein the dispersion is both contacted with and separated from the resin by passage through a bed packed with said resin.

9. The process for removing cerium (III) adsorbed on a strong cation ion exchange resin from said resin which comprises contacting said resin under acidic conditions with a solution of a salt whereby an insoluble precipitate is formed from said adsorbed cerium (III) and thereafter separating said precipitate from said resin.

10. The process of claim 9 wherein the precipitate is a cerium (III) sulfate.

11. The process of claim 9 wherein the precipitate is cerium (III) oxalate.

12. The process of claim 10 wherein the precipitate is formed by contacting said resin with a solution of sodium sulfate which is at least about 0.36 molar in sodium sulfate.

13. The process of claim 10 wherein the solution is from about 0.5 molar to about 1.0 molar in sodium sulfate.

14. The process of claim 11 wherein the precipitate is formed by contacting said resin with a solution of sodium oxalate which is at least about 0.20 molar in sodium oxalate.

15. The process for simultaneously releasing adsorbed cerium (III) from a strong cation exchange resin in the combined hydrogen-sodium form and regenerating said resin which comprises contacting said resin with a solution of sodium sulfate in weak sulfuric acid, said solution being from about 0.5 to about 1.0 molar in sodium sulfate.

16. Process for the recovery of cerium (III) contained in a stable aqueous, acidic polymeric dispersion having a pH of less than about 5.0 and oxidation of said cerium (III) to cerium (IV) which comprises:
contacting said aqueous dispersion with a strong acid cation exchange resin wherein said cation is selected from the group consisting of hydrogen ion and hydrogen ion in combination with sodium, potassium, lithium or ammonium ion thereby adsorbing said cerium (III) onto said resin,
separating said resin along with adsorbed cerium (III) from said aqueous dispersion,
contacting said separated resin under acidic conditions with a solution of a salt whereby an insoluble cerium (III) precipitate is formed from said adsorbed cerium (III),
separating said precipitate from said resin, and
oxidizing the cerium (III) contained in said precipitate to cerium (IV).

17. Process of claim 16 wherein the dispersion is a stable aqueous dispersion comprised of a starch graft copolymer, the precipitate is a sulfate salt and the oxidation step is carried out in an aqueous medium with a pH of at least about 6 using oxygen as the oxidizing agent.

18. A stable aqueous starch graft copolymer dispersion, substantially free of cerium (III), prepared by the process of claim 4.

* * * * *